(12) United States Patent
Curk et al.

(10) Patent No.: US 10,106,200 B2
(45) Date of Patent: Oct. 23, 2018

(54) CROSS MEMBER AND COCKPIT MODULE

(71) Applicant: MAGNA STEYR Fahrzeugtechnik AG & Co KG, Graz (AT)

(72) Inventors: Martin Curk, St. Martin am Woellmissberg (AT); Johann Domweber, Hatzendorf (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 0 days.

(21) Appl. No.: 15/666,756

(22) Filed: Aug. 2, 2017

(65) Prior Publication Data

US 2018/0037269 A1 Feb. 8, 2018

(30) Foreign Application Priority Data

Aug. 5, 2016 (DE) .................. 10 2016 214 579

(51) Int. Cl.
*B62D 25/14* (2006.01)
*B62D 29/00* (2006.01)

(52) U.S. Cl.
CPC ......... *B62D 25/145* (2013.01); *B62D 29/008* (2013.01)

(58) Field of Classification Search
CPC .................................................. B62D 25/145
USPC .................................................. 296/193.02
See application file for complete search history.

(56) References Cited

U.S. PATENT DOCUMENTS

| 5,934,733 | A | 8/1999 | Manwaring | |
|---|---|---|---|---|
| 6,276,739 | B1 * | 8/2001 | Wich | B62D 25/145 296/193.02 |
| 6,315,347 | B1 * | 11/2001 | Gotz | B62D 25/147 296/203.02 |
| 7,891,726 | B2 * | 2/2011 | Gavrilov | B62D 21/15 188/377 |
| 2004/0036310 | A1 | 2/2004 | Mills | |
| 2004/0108744 | A1 * | 6/2004 | Scheib | B62D 25/142 296/70 |
| 2004/0262954 | A1 * | 12/2004 | Scheib | B62D 25/142 269/193.02 |
| 2015/0056428 | A1 * | 2/2015 | Birka | B29C 45/14778 428/209 |

FOREIGN PATENT DOCUMENTS

| DE | 19720902 A1 | 11/1998 |
|---|---|---|
| DE | 102004033277 A1 | 2/2006 |
| DE | 102006044699 A1 | 4/2008 |
| DE | 102011052250 A1 | 1/2013 |

(Continued)

OTHER PUBLICATIONS

Notice of Reasons for Rejection for Japanese Patent Application No. 2017-147419, dated Jul. 17, 2018, 4 pages including 2 pages of English translation.

*Primary Examiner* — Jason S Morrow
(74) *Attorney, Agent, or Firm* — Jordan IP Law, LLC; Todd A. Vaughn

(57) ABSTRACT

A cross-member for a motor vehicle includes a main strut oriented substantially horizontally in an installation direction, and a tunnel support oriented substantially vertically in the installation direction. The main strut has complete mounting points formed on both sides of the tunnel support for mounting the steering console on both the left side and the right side of the tunnel support in the installation direction.

14 Claims, 6 Drawing Sheets

(56) References Cited

FOREIGN PATENT DOCUMENTS

| | | | |
|---|---|---|---|
| EP | 2028032 | A2 | 2/2009 |
| JP | 2001527483 | A | 12/2001 |
| JP | 2002293166 | A | 10/2002 |

\* cited by examiner

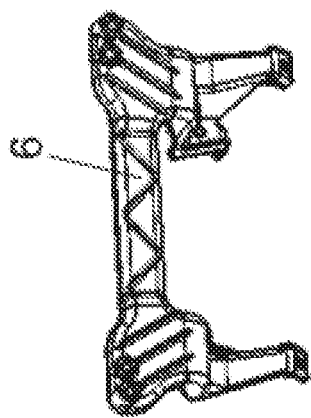
Fig. 5
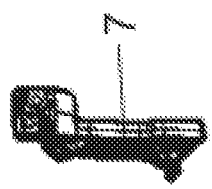
Fig. 7
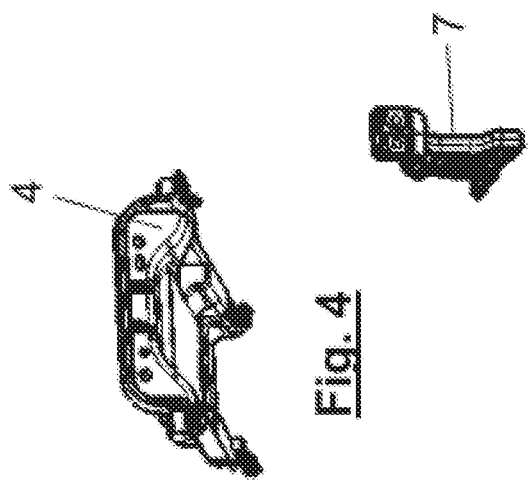
Fig. 6
Fig. 4

CROSS MEMBER AND COCKPIT MODULE

CROSS-REFERENCE TO RELATED APPLICATIONS

The present application claims priority 35 U.S.C. § 119 to German Patent Publication No. DE 10 2016 214 579.7 (filed on Aug. 5, 2016), which is hereby incorporated by reference in its complete entirety.

TECHNICAL FIELD

Embodiments relate to a cross-member for a motor vehicle and a cockpit module for a motor vehicle comprising such a cross-member. Embodiments also relate to a set of such cockpit modules.

BACKGROUND

The use of cross-members in a motor vehicle is known, in particular, cross-members running between the A-pillars of a vehicle, which above all may serve to fix cockpit components of the vehicle, such as above all a steering column but also for example an instrument panel, an air conditioning system and airbags. Such cross-members are normally attached not only by the side fixings at the A-pillars but also via supporting elements on the centre tunnel of the motor vehicle.

WO 03/104061 A2 describes a cross-member for a motor vehicle, wherein the cross-member is formed from a base body and a reinforcement, wherein the cross-member has at least one wall running transversely to the cross-member. In particular, a wall is provided at the ends of the cross-member (A-pillar connection), in the region of the connections for the airbag, steering column and tunnel strut, and wherever else brackets are required.

EP 1 544 085 A2 discloses a cross-member for a vehicle, comprising a main strut with a portion in the form of an open channel running in the direction of the main direction of the cross-member, an auxiliary strut arranged adjacent thereto, a tunnel support and a steering column connection, wherein the auxiliary strut is connected torsionally rigidly to the tunnel support and to the steering column connection.

SUMMARY

Embodiments relate to a cross-member for a motor vehicle and a cockpit module for a motor vehicle comprising such a cross-member, which may be used cost-savingly for production of left-hand drive vehicles and right-hand drive vehicles. Embodiments also concern a set, i.e., a quantity of such cockpit modules.

In accordance with embodiments, a cross-member for a motor vehicle may include a main strut oriented substantially horizontally in an installation direction, and a tunnel support oriented substantially vertically in the installation direction. The main strut has complete mounting points for mounting a steering console, and complete mounting points for mounting a steering console are formed on the main strut on both sides of the tunnel support. In that way, a steering console may be mounted on both the left and the right of the tunnel support in the installation position.

In accordance with embodiments, a cross-member for a vehicle cockpit is configured such that the same cross-member is prepared for fitting of a steering console both on the left of the tunnel support, and therefore, on the left of the centre tunnel of the motor vehicle, i.e. for a left-hand drive vehicle, and also, for mounting on the right of the centre tunnel, i.e., for a right-hand drive vehicle. Complete fixing points, i.e., a sufficient quantity thereof for mounting the steering console, are therefore provided on each of the two sides. The fixing points may, in particular, be formed by fixing bores and/or fixing tabs which may serve for later bolting or similar fixing of the steering console.

In accordance with embodiments, the cross-member is therefore equipped with additional fixing points which in themselves would not be necessary for the vehicle in which the cross-member is used. Here, however, for example, lower tooling costs, lower stock storage costs, and overall more economic production result from production of a higher number of identical parts.

In accordance with embodiments, the cross-member may be formed mirror-symmetrically relative to a mirror plane laying normal to the main strut. The cross-member is therefore constructed identically, mirror-symmetrically, on the left and right of the tunnel support.

In accordance with embodiments, complete mounting points for mounting a passenger grip bracket and/or a knee airbag bracket and/or all brackets which may be attached to the main strut are arranged on both sides of the tunnel support or centre plane of the tunnel support, in particular on the main strut or on the tunnel support, so that a passenger grip bracket and/or a knee airbag bracket and/or all brackets which may be attached to the main strut may be mounted on both the left and the right of the tunnel support or centre plane of the tunnel support in the installation position. Thus the specified, for example, each, bracket for fixing of further components to the cross-member are attached on both the right and the left, for use in either left-hand drive or right-hand drive vehicles. The "centre plane" of the tunnel support is a plane which runs horizontally centrally through the tunnel support and stands normal to the main strut, and hence, for a mirror-symmetrical cross-member, constitutes its mirror plane.

In accordance with embodiments, the cross-member may comprise an injection-moulded component, in particular, a magnesium injection-moulded component.

In accordance with embodiments, a cockpit module for a motor vehicle comprises such a cross-member and a steering console, wherein the steering console is mounted at the complete mounting points for mounting a steering console either on the left or on the right of the tunnel support.

In accordance with embodiments, such a cockpit module also comprises a passenger grip bracket, wherein the passenger grip bracket is mounted at the complete mounting points for mounting a passenger grip bracket on the side of the tunnel support which lies opposite the steering console.

In accordance with embodiments, in a set of cockpit modules as described herein, the steering console is mounted at the complete mounting points for mounting a steering console on the left of the tunnel support on at least one cross-member of at least one cockpit module of the set, and on the right of the tunnel support on at least one cross-member of at least a further cockpit module. Similarly, preferably the other brackets are attached in the same position in all cockpit modules with steering console arranged on the left, and otherwise at the same position in all cockpit modules with steering console arranged on the right, so that the set of cockpit modules comprises a sub-quantity of left-hand drive cockpit modules and a sub-quantity of right-hand drive cockpit modules. The cross-members of all cockpit modules of the set are configured identically, since individual cross-members are prepared for both left-hand drive vehicles and for right-hand drive vehicles.

In particular, all cross-members of the set are formed mirror-symmetrically relative to a mirror plane which stands normal to the main strut. In particular, the left-hand drive cockpit modules are configured mirror-symmetrically to the right-hand drive cockpit modules, again relative to a mirror plane which stands normal to the two main struts of the cockpit modules to be compared.

In accordance with embodiments, the steering console, and/or the passenger grip bracket, and/or the knee airbag bracket may be configured as identical parts for use in both left-hand drive cockpit modules and in right-hand drive cockpit modules.

Said attachments may also be configured as mirror-symmetrical components for use on a left-hand drive cockpit module on one side, and a right-hand drive cockpit module on the other, with (in an installed state), the same mirror plane as indicated for the cross-member, i.e., normal to the main strut of the cross-member.

In particular, the steering console and the passenger grip bracket and the inner knee airbag bracket on the left and right of the centre tunnel may be produced as identical parts, and the outer knee airbag bracket on the left and right of the centre tunnel as mirror-symmetrical components.

DRAWINGS

Embodiments will be illustrated by way of example in the drawings and explained in the description below FIG. 1 illustrates a three-dimensional view of a cockpit module in a left-hand drive variant, in accordance with embodiments.

FIG. 4 illustrates a three-dimensional view of a steering console which may be used as an identical part on the cross-member of FIG. 3 in both left-hand drive and right-hand drive variants, in accordance with embodiments.

FIG. 5 illustrates a three-dimensional view of a passenger grip bracket which may be used as an identical part on the cross-member of FIG. 3 in both left-hand drive and right-hand drive variants.

FIG. 6 illustrates a three-dimensional view of an inner knee airbag bracket which may be used as an identical part on the cross-member of FIG. 3 in both left-hand drive and right-hand drive variants (e.g., on the driver's side), in accordance with embodiments.

FIG. 7 illustrates a three-dimensional view of a further inner knee airbag bracket which may be used as an identical part on the cross-member of FIG. 3 in both left-hand drive and right-hand drive variants (e.g., on the driver's side), in accordance with embodiments.

DESCRIPTION

Figure 1:
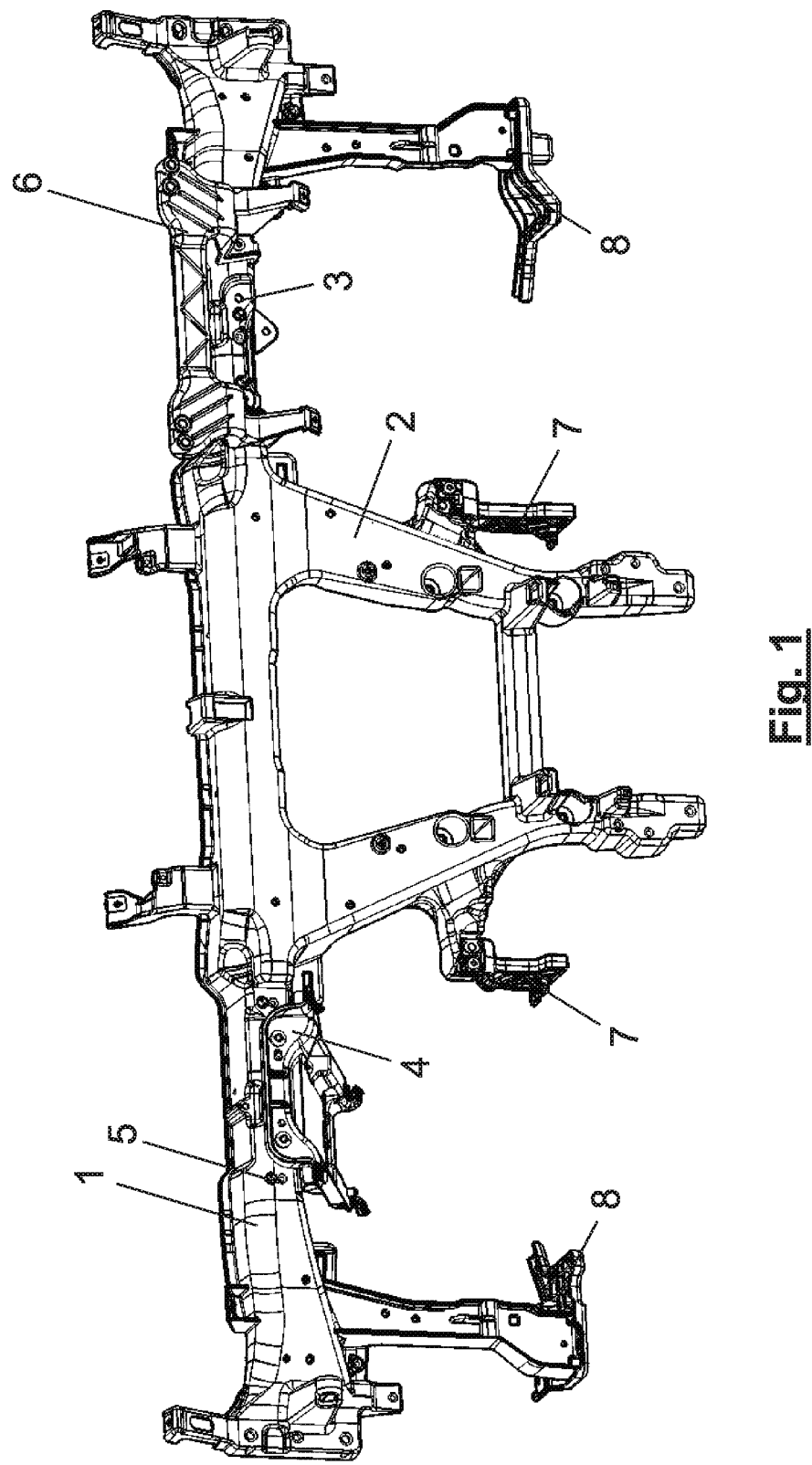

FIG. 1 illustrates a cross-member for a motor vehicle which, in accordance with embodiments. The cross-member comprises a main strut 1 oriented substantially horizontally in an installation direction, which at its ends has provision for fixing to A-pillars of the motor vehicle. The cross-member also comprises a tunnel support 2 oriented substantially vertically in the installation direction (to extend substantially perpendicularly from the main strut 1), for fixing of the cross-member to a centre tunnel of the motor vehicle. Fixing/attachment architecture configured for fixing/attaching to a bulkhead of the motor vehicle may be provided on the cross-member, in particular, on main strut 1. In accordance with embodiments, the cross-member may be a magnesium injection-moulded component.

The main strut 1 has complete mounting points 3, for instance, fixing bores for mounting of a steering console 4. The steering console 4 is configured to receive a steering column for the motor vehicle. The complete mounting points 3 for mounting of a steering console 4 are formed on the main strut 1 on both sides of the tunnel support 2, so that in the installation position, a steering console 4 may be mounted on both the left and the right of the tunnel support 2. In FIG. 1, the steering console 4 is mounted on the left of the tunnel support 2. The cockpit module illustrated is therefore prepared for a left-hand drive vehicle.

Figure 3:
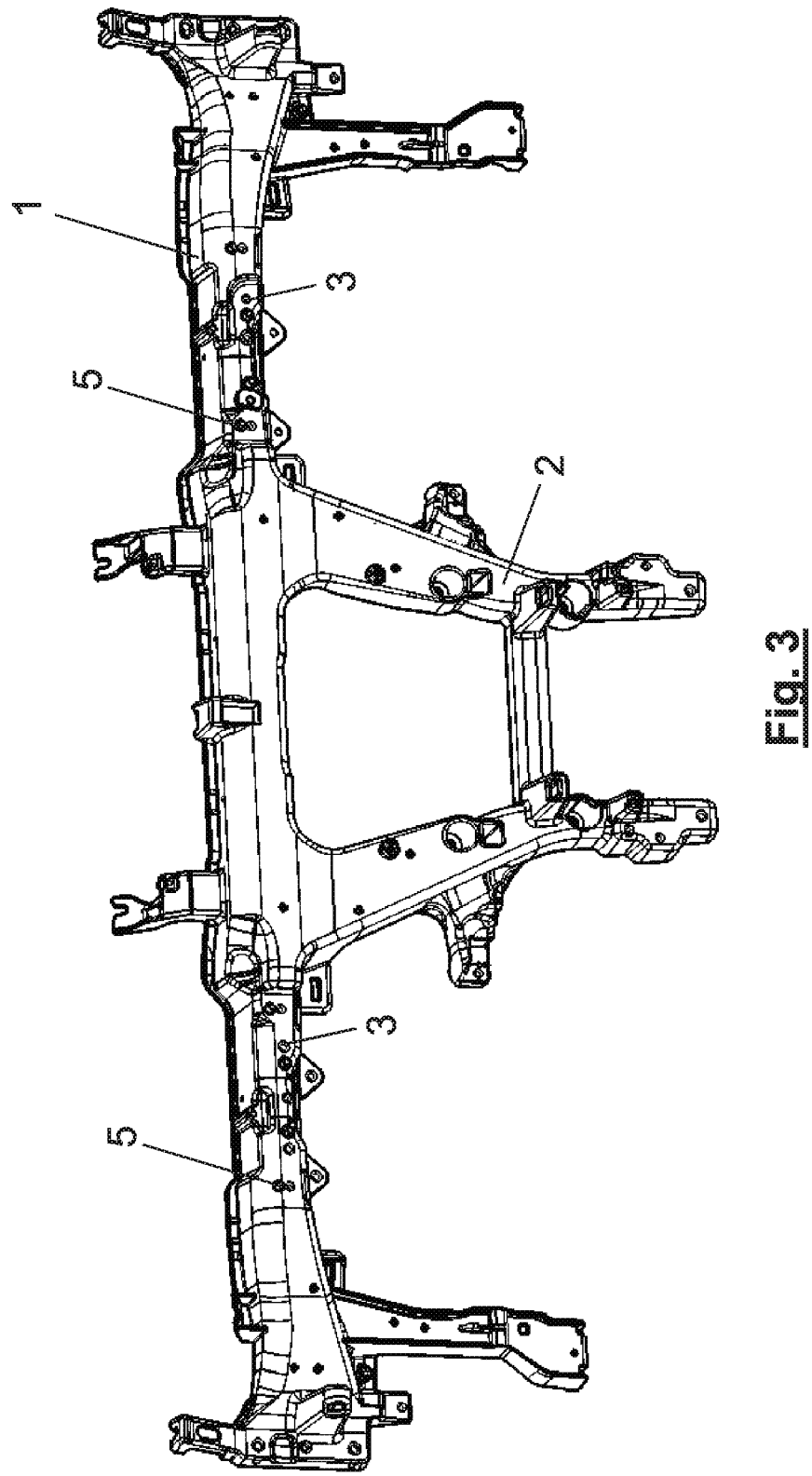
FIG. 3 illustrates a three-dimensional view of a cross-member, in accordance with embodiments.

As illustrated in FIG. 3, the cross-member is configured mirror-symmetrically relative to a mirror plane which stands normal to the main strut 1, the cross-member illustrated therein without attachments.

Furthermore, complete mounting points 5 for mounting of a passenger grip bracket 6 are formed on the main strut 1 on both sides of the tunnel support 2, together with complete mounting points for mounting of inner knee airbag brackets 7 on the left and right of the tunnel support 2, and complete mounting points for mounting of outer knee airbag brackets 8 on the left and right of the tunnel support.

A passenger grip bracket 6, an inner knee airbag bracket 7, an outer knee airbag bracket 8, and in some cases additional brackets, may therefore, be mounted on both the left and the right of the centre point of the tunnel support 2 in the installation position, so that the same cross-member may be used for both left-hand drive vehicles and right-hand drive vehicles.

Figure 2:
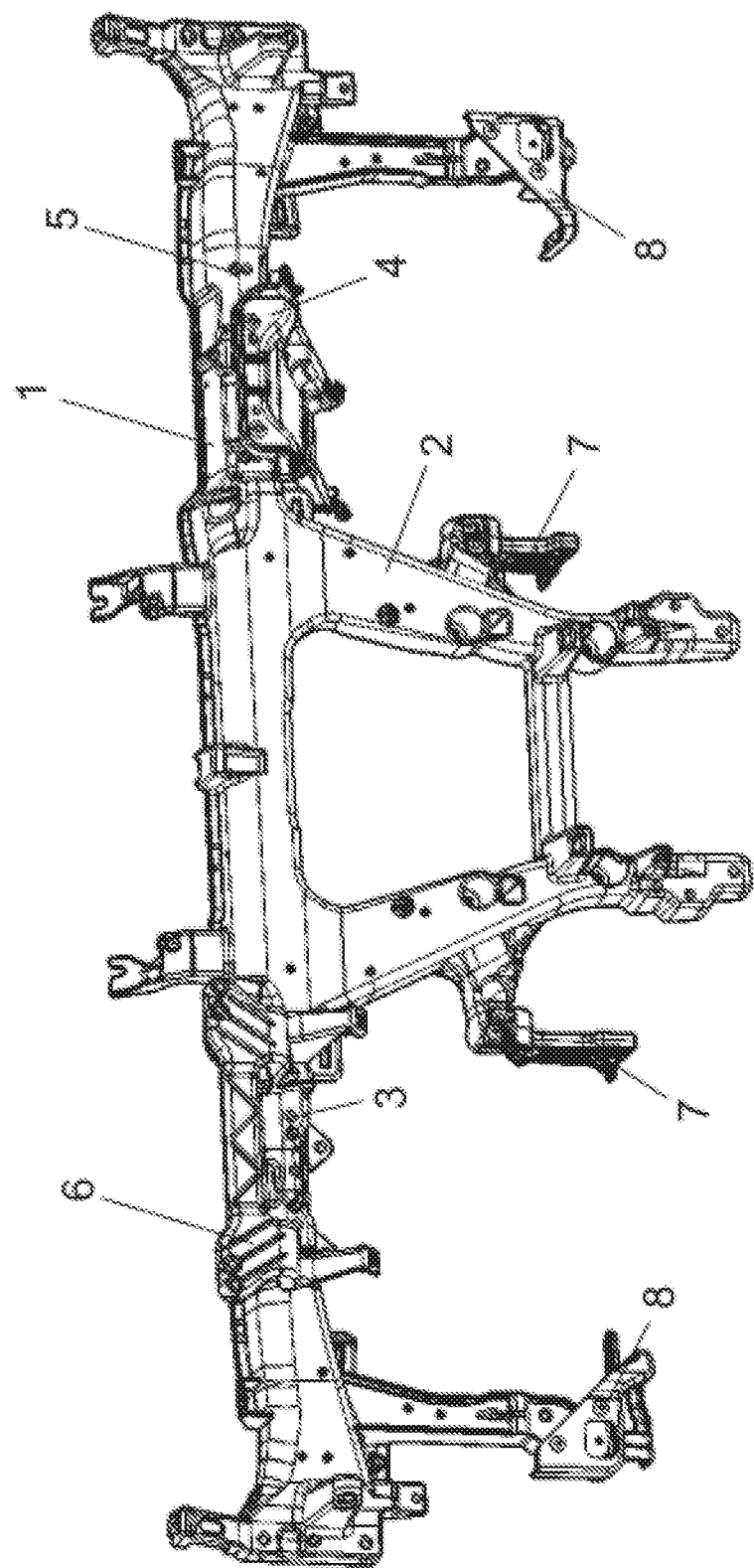
FIG. 2 illustrates a three-dimensional view of a cockpit module in a right-hand drive variant, in accordance with embodiments.

FIG. 2 illustrates, in a similar fashion to FIG. 1, a cockpit module in accordance with embodiments, but in a variant for a right-hand drive vehicle. The steering console 4 is therefore mounted on the right of the tunnel support 2, and the passenger grip bracket 6 on the left of the tunnel support 2.

FIG. 3 illustrates a cross-member in accordance with embodiments without attachments. The cross-member is constructed relative to a mirror plane which stands centrally on the main strut 1 and normal to the main strut 1. The complete mounting points 3, 5 of all brackets to be attached to the cross-member are therefore prepared mirror-symmetrically to each other on both the left and the right of the tunnel support 2.

FIGS. 4 to 7 each illustrate an attachment for a cross-member which is configured as an identical part, so that the same component may be fitted on both the left and the right of the tunnel support 2 in a set of cockpit modules; namely a steering console 4 (FIG. 4), a passenger grip bracket 6 (FIG. 5) and two inner knee airbag holders 7, one for the passenger's side (FIG. 6) and one for the driver's side (FIG. 7).

Figure 10:
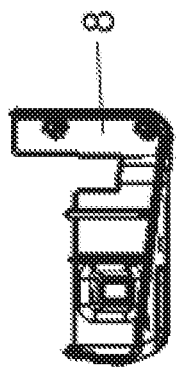
FIG. 10 illustrates a three-dimensional view of an outer knee airbag bracket which may be used on the cross-member of FIG. 3 in the left-hand drive variant, and may be used as a mirror part on the cross-member of FIG. 3 in the right-hand drive variant, in accordance with embodiments.
Figure 11:
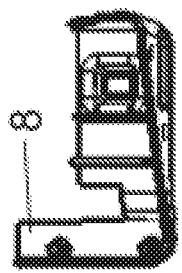
FIG. 11 illustrates a three-dimensional view of an outer knee airbag bracket which may be used on a cross-member of FIG. 3 in the right-hand drive variant, and may be used as a mirror part on the cross-member in the left-hand drive variant, in accordance with embodiments.
Figure 8:
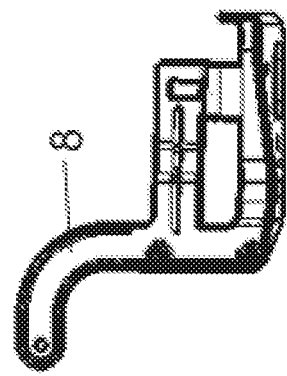
FIG. 8 illustrates a three-dimensional view of an outer knee airbag bracket which may be used on the cross-member of FIG. 3 in the left-hand drive variant, and may be used as a mirror part on the cross-member of FIG. 3 in the right-hand drive variant, in accordance with embodiments.
Figure 9:
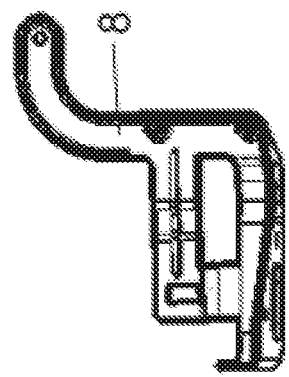
FIG. 9 illustrates a three-dimensional view of an outer knee airbag bracket which may be used on the cross-member of FIG. 3 in the right-hand drive variant, and may be used as the mirror part on the cross-member in the left-hand drive variant, in accordance with embodiments.

FIGS. 9 to 11 illustrate outer knee airbag brackets 8 configured as mirror parts, here firstly for a left-hand drive vehicle (FIGS. 8 and 10), and secondly, configured mirror-symmetrically thereto, for a right-hand drive vehicle (FIGS. 9 and 11). One of the components illustrated may be is used on the driver's side (FIGS. 8 and 9), and a differently configured component may be used on the passenger's side (FIGS. 10 and 11).

Figure 12:
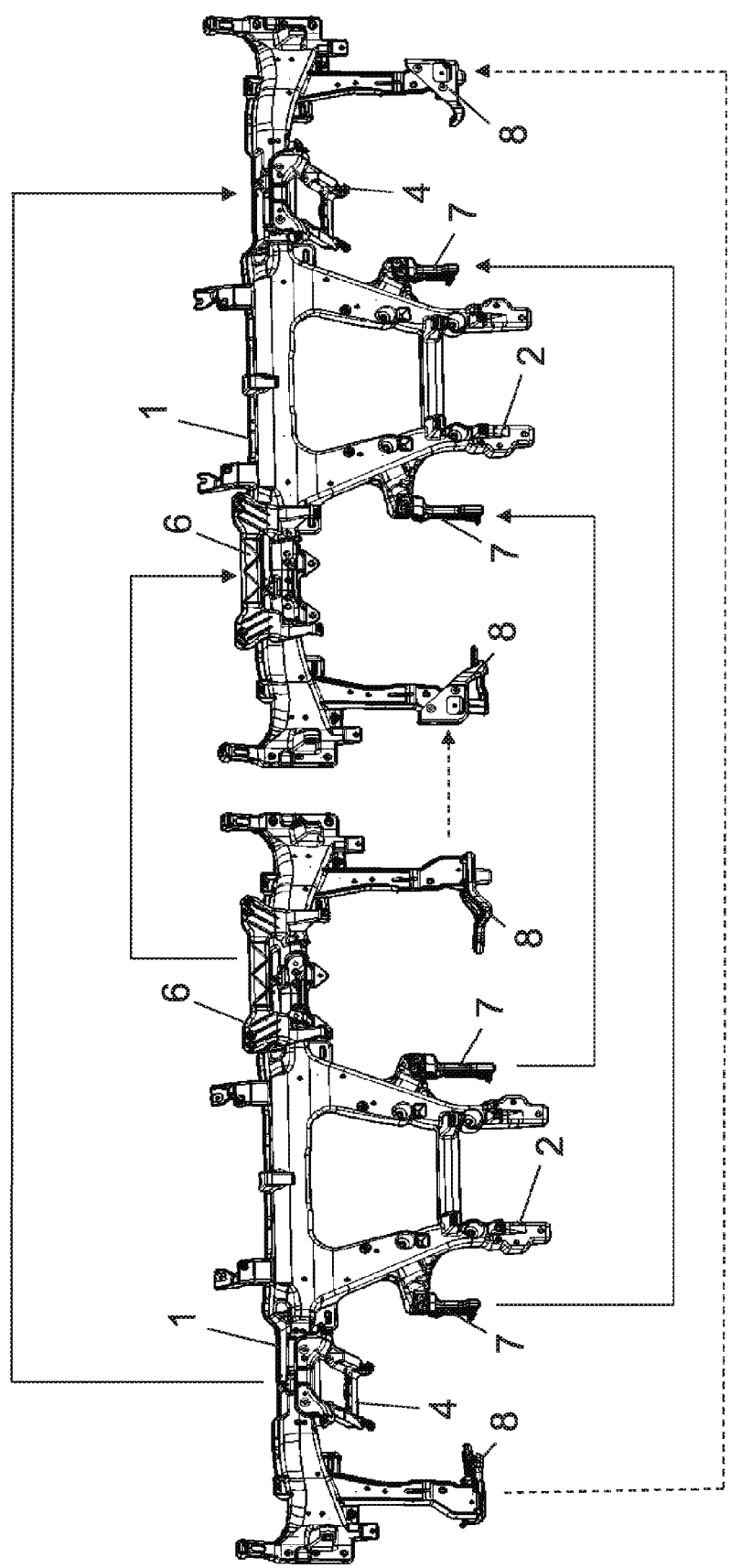
FIG. 12 illustrates a three-dimensional view of a set of cockpit modules that includes a cockpit module in a left-hand drive variant and a cockpit module in a right-hand drive variant, in accordance with embodiments.

FIG. 12 illustrates a set of cockpit modules, i.e., a cockpit module in a left-hand drive variant (on the left) and a cockpit module in a right-hand drive variant (on the right). Both cockpit modules are fitted with their respective attachments. For greater clarity, the same parts of the two cockpit modules, namely, the steering console 4, the passenger grip bracket 6, two different inner knee airbag holders 7, are linked together by arrows with solid lines. The mirror parts, i.e. components mirror-symmetrical to each other, namely, two different outer knee airbag holders 8, are linked together by arrows with dotted lines. Some of the cockpit modules of such a set of cockpit modules are therefore configured for left-hand drive vehicles and some for right-hand drive vehicles, and both variants use exclusively identical parts, such as the cross-member itself, or parts which are mirror-symmetrical to each other.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second, etc. are used herein only to facilitate discussion, and carry no particular temporal or chronological significance unless otherwise indicated.

This written description uses examples to disclose the invention, including the preferred embodiments, and also to enable any person skilled in the art to practice the invention, including making and using any devices or systems and performing any incorporated methods. The patentable scope of embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, may be mixed and matched by one of ordinary skill in the art to construct additional embodiments and techniques in accordance with principles of this application.

LIST OF REFERENCE NUMERALS

1 Main strut
2 Tunnel support
3 Complete mounting point for mounting a steering console
4 Steering console
5 Complete mounting point for mounting a passenger grip bracket
6 Passenger grip bracket
7 Inner knee airbag bracket
8 Outer knee airbag bracket

What is claimed is:

1. A cross-member for a motor vehicle, the cross-member comprising:
a main strut oriented substantially horizontally in an installation direction, the main strut having first mounting points configured for mounting a steering console;
a tunnel support oriented substantially vertically in the installation direction, wherein the first mounting points are formed on a left side and a right side of the tunnel support to mount the steering console on both the left side and the right side of the tunnel support in the installation direction;
second mounting points arranged on a left side and a right side of a centre plane of the tunnel support to mount a passenger grip bracket on both the left side and the right side of the centre plane of the tunnel support in the installation position; and/or
third mounting points arranged on the left side and the right side of the centre plane of the tunnel support to mount a knee airbag on both the left side and the right side of the centre plane of the tunnel support in the installation position; and/or
fourth mounting points arranged on the left side and the right side of the centre plane of the tunnel support to mount other brackets to be attached to the main strut on both the left side and the right side of the centre plane of the tunnel support in the installation position.

2. The cross-member of claim 1, wherein the cross-member is formed mirror-symmetrically relative to a mirror plane laying normal to the main strut.

3. The cross-member of claim 1, wherein the cross-member comprises an injection-moulded component.

4. The cross-member of claim 1, wherein the cross-member comprises a magnesium injection-moulded component.

5. A cockpit module for a motor vehicle, the cockpit module comprising:
a steering console; and
a cross-member including:
a main strut oriented substantially horizontally in an installation direction, the main strut having first mounting points configured for mounting the steering console;
a tunnel support oriented substantially vertically in the installation direction, wherein the first mounting points are formed on a left side and a right side of the tunnel support to mount the steering console on both the left side and the right side of the tunnel support in the installation direction;
second mounting points arranged on a left side and a right side of a centre plane of the tunnel support to mount a passenger grip bracket on both the left side and the right side of the centre plane of the tunnel support in the installation position; and/or
third mounting points arranged on the left side and the right side of the centre plane of the tunnel support to mount a knee airbag on both the left side and the right side of the centre plane of the tunnel support in the installation position; and/or
fourth mounting points arranged on the left side and the right side of the centre plane of the tunnel support to mount other brackets to be attached to the main strut on both the left side and the right side of the centre plane of the tunnel support in the installation position.

6. A set of cockpit modules, each cockpit module in the set comprising:
- a steering console; and
- a cross-member including:
  - a main strut oriented substantially horizontally in an installation direction, the main strut having first mounting points configured for mounting the steering console;
  - a tunnel support oriented substantially vertically in the installation direction, wherein the first mounting points are formed on a left side and a right side of the tunnel support to mount the steering console on both the left side and the right side of the tunnel support in the installation direction;
  - second mounting points arranged on a left side and a right side of a centre plane of the tunnel support to mount a passenger grip bracket on both the left side and the right side of the centre plane of the tunnel support in the installation position; and/or
  - third mounting points arranged on the left side and the right side of the centre plane of the tunnel support to mount a knee airbag on both the left side and the right side of the centre plane of the tunnel support in the installation position; and/or
  - fourth mounting points arranged on the left side and the right side of the centre plane of the tunnel support to mount other brackets to be attached to the main strut on both the left side and the right side of the centre plane of the tunnel support in the installation position, wherein the steering console is mounted at the first mounting points on the left of at least one cross-member of at least one cockpit module in the set of cockpit modules, and on the right of the tunnel support on at least one cross-member of at least one cockpit module in the set of cockpit modules.

7. The cross-member of claim 1, wherein the tunnel support is configured to extend substantially perpendicularly from the main strut.

8. The cockpit module of claim 5, wherein the tunnel support is configured to extend substantially perpendicularly from the main strut.

9. The cockpit module of claim 5, wherein the cross-member is formed mirror-symmetrically relative to a mirror plane laying normal to the main strut.

10. The cockpit module of claim 5, wherein the cross-member comprises an injection-moulded component.

11. The cockpit module of claim 5, wherein the cross-member comprises a magnesium injection-moulded component.

12. The set of cockpit modules of claim 6, wherein the cross-member is formed mirror-symmetrically relative to a mirror plane laying normal to the main strut.

13. The set of cockpit modules of claim 6, wherein the cross-member comprises an injection-moulded component.

14. The set of cockpit modules of claim 6, wherein the cross-member comprises a magnesium injection-moulded component.

* * * * *